UNITED STATES PATENT OFFICE.

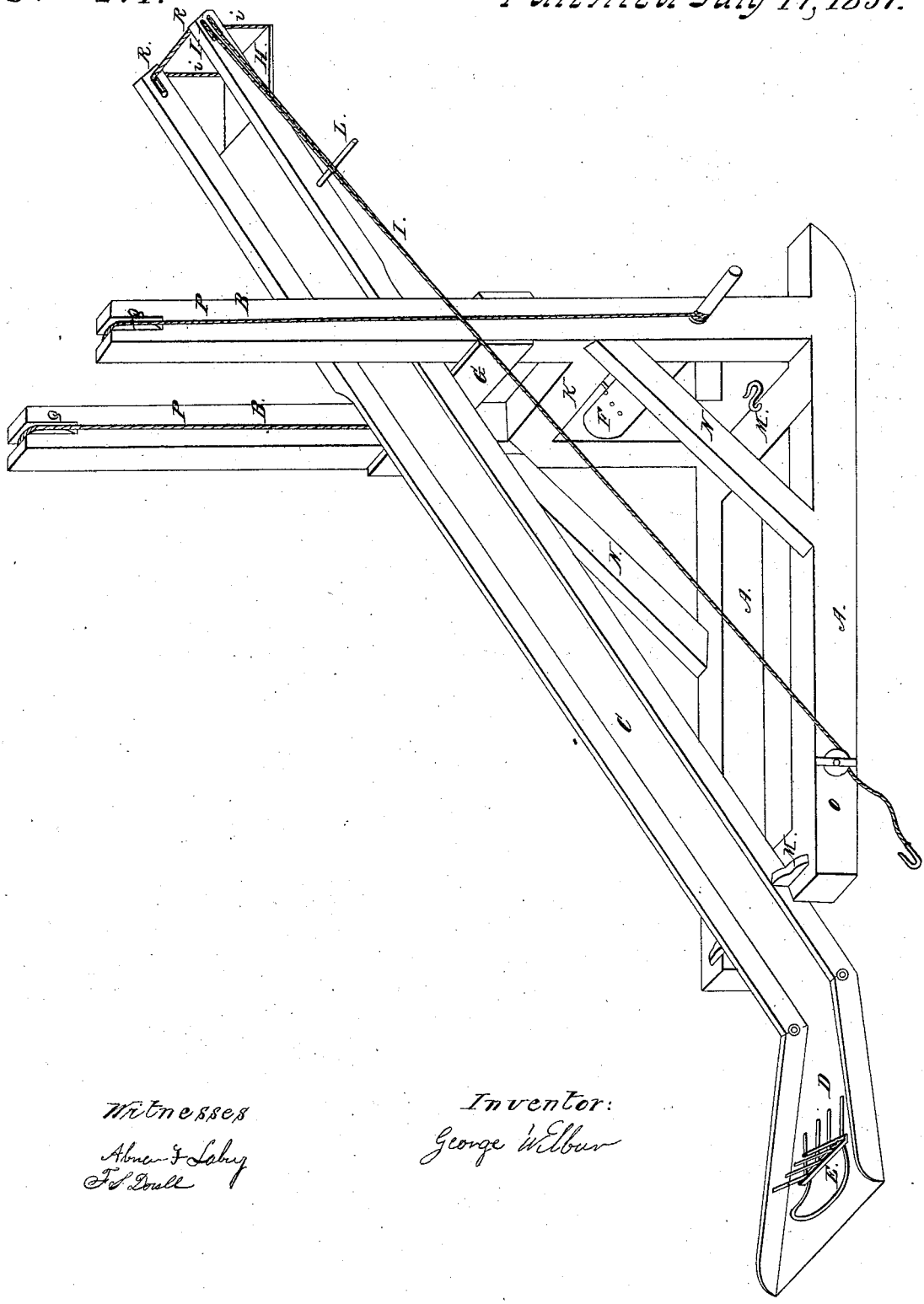

GEORGE WILBUR, OF MACEDON, NEW YORK.

MACHINE FOR ELEVATING HAY INTO BARNS.

Specification of Letters Patent No. 271, dated July 17, 1837.

*To all whom it may concern:*

Be it known that I, GEORGE WILBUR, of Macedon, in the county of Wayne and State of New York, have invented a new and useful Machine for Elevating Hay into Barns and upon Stacks; and I do hereby declare that the following is a full and exact description.

The nature of my invention consists in the combination of an inclined plane with an elevator on which it is supported and by which its height is regulated for the purpose above mentioned as follows: There are to be two horizontal sills about sixteen feet in length of a convenient size, about ten feet apart, and connected by two cross sills, about ten feet in length of the same size. Into the said first described sills, are to be fixed two upright posts, to incline in the direction of the plane at the pleasure of the builder, of the same size as the sills and about 18 feet in length and connected together by a cross girt, the said upright posts to be supported and made firm by braces fixed in them and the said horizontal sills; there is to be an inclined plane about 28 feet in length six feet in width resting upon a sliding beam and the front cross horizontal sill; at the elevated end of the plane there is to be a movable platform to be used (when necessary) in finishing off and completing the top of the stack. When used, one end of the platform to be supported by ropes attached to the ends of the side pieces which are to be extended about 8 feet beyond the elevated end of the inclined plane, the other end of the platform to be attached to the inclined plane; at other times to be slid under the plane; there is to be a movable or sliding beam, with ends embracing the upright post, so as to move steadily up and down between said posts, and to be attached to the inclined plane by a hinge and fitted with ropes and a windlass in such a manner as to be easily depressed or elevated. At the lower or depressed end of the inclined plane there is to be a receiver about nine feet in length and about ten feet wide and attached to the plane with joints, in such a manner as to be easily movable and adapted to the changes in the elevation of the inclined plane, its sides to be fitted with side pieces; on the sides of the inclined plane are to be side pieces of about six inches wide and three inches thick; to prevent the hay from falling off the plane, and to keep the rake in its place. The rake is to be fitted to the plane and to be moved by means of ropes and pulleys in such a manner as to carry up the hay upon the plane; at each end of the rake is to be attached a rope which is to run over the pulleys at the elevated ends of the side pieces; then passing over a pin in one of the side pieces above the upright posts to another pulley fixed on the outer side of one of the horizontal sills; the rope to be furnished with a hook to which the power used is to be applied. There is to be a windlass fixed between the upright posts and immediately under the cross girt for the purpose of elevating or depressing the sliding beam; the axes of said windlass to run through the upright posts, the ropes used in elevating or depressing the sliding beam to be attached to these axes on the outer side of the posts, the ropes to pass over the top of said posts, in which there are to be pulleys then running downward on the inner side of said post. Said ropes are to be attached to said sliding beam, so that by turning the windlass the said beam may be elevated or depressed, the hinge connecting the plane with the sliding beam is to be placed at such a point in said plane as to discharge the hay near the center of the stack. The dimensions of the timber to be used and the proportions of the machine may be made or varied to suit builders.

What I claim as my invention and desire to secure by Letters Patent is—

The combination of an inclined plane with an elevator on which it is supported and by which its height is regulated, both possessing the characteristics and construction substantially as above set forth.

GEORGE WILBUR.

Witnesses:
THERON R. STRONG,
FREDERIC S. LOVELL.